Oct. 7, 1941.  H. J. DE N. McCOLLUM  2,257,972
THERMOSTATIC VALVE
Original Filed Jan. 14, 1937
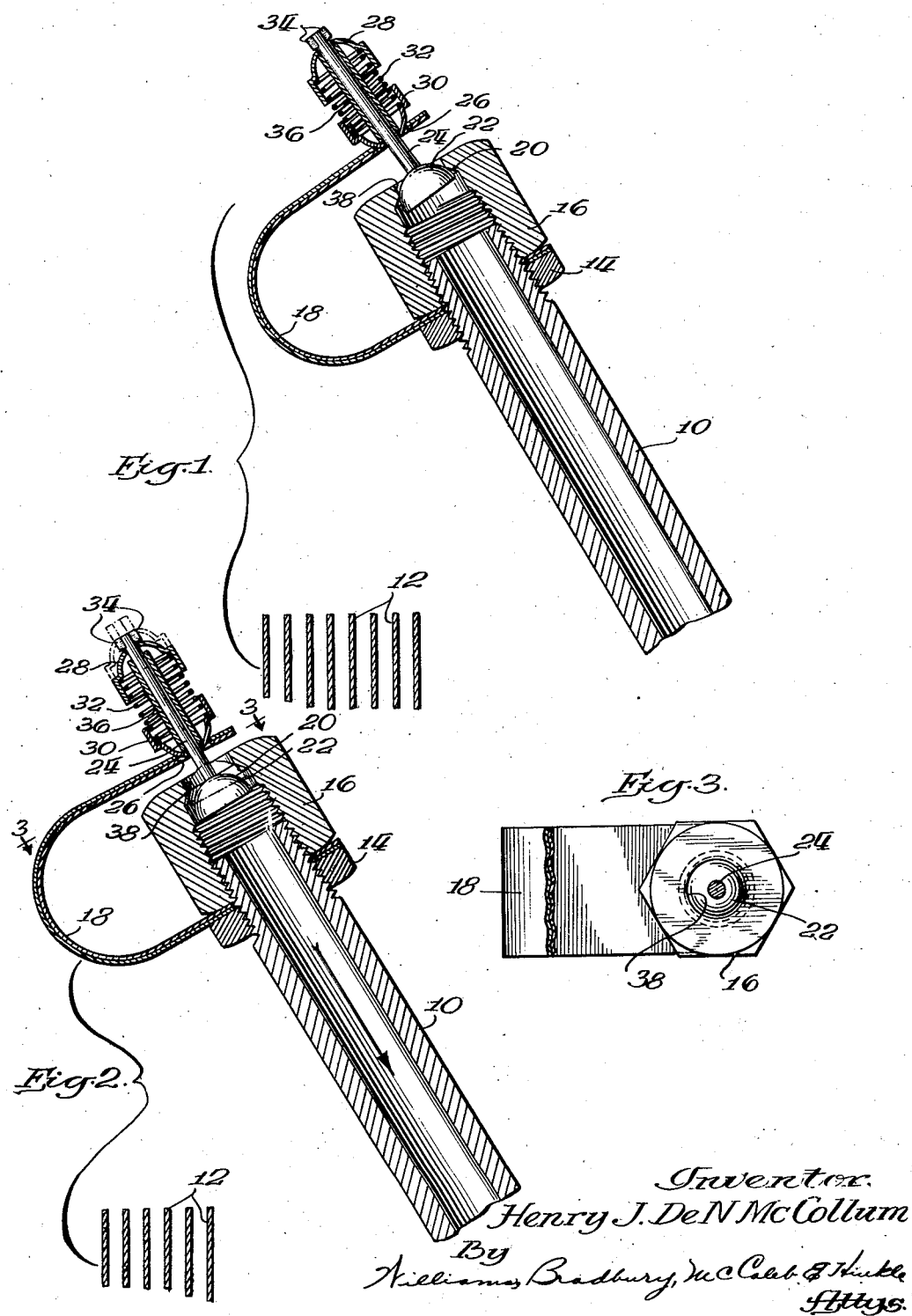
Inventor.
Henry J. De N McCollum
By Williams, Bradbury, McCaleb & Hinkle
Attys.

Patented Oct. 7, 1941

2,257,972

UNITED STATES PATENT OFFICE 2,257,972

THERMOSTATIC VALVE

Henry J. De N. McCollum, Evanston, Ill.

Original application January 14, 1937, Serial No. 120,524. Divided and this application November 29, 1937, Serial No. 177,077

5 Claims. (Cl. 236—101)

This application is a division of my copending application Serial No. 120,524, filed January 14, 1937, and relates generally to thermostatically controlled valves.

In my aforesaid copending application is disclosed an automobile heater of the internal combustion type in which it is desirable to admit atmospheric air to the combustion chamber whenever the radiator becomes overheated or the air circulating fan fails. The particular valve construction devised by me for accomplishing this result forms the subject matter of the present invention.

It is an object of this invention to provide an improved thermostatically controlled valve mechanism which is operative when at a low temperature to hold the valve firmly closed, and as the temperature increases, to decrease the force tending to hold the valve closed and to permit it to open due to differential pressure upon the opposite sides of the valve.

It is a further object to provide an improved temperature responsive valve mechanism in which the valve is held firmly closed under one temperature condition, whereas, at other temperatures, the valve is resiliently held closed.

A further object is to provide a simple and effective temperature responsive check valve means adapted for use in internal combustion type automobile heaters and similar devices, which presents little likelihood of getting out of order, and which may be economically manufactured.

Other objects will appear from the following description, reference being had to the accompanying drawing, in which:

Fig. 1 is a central vertical sectional view of the valve mechanism showing the valve in normal closed position;

Fig. 2 is a similar view showing the valve in open position; and

Fig. 3 is a transverse sectional view taken on the line 3—3 of Fig. 2.

The valve mechanism is shown as applied to the end of a pipe or tube 10 and which is adapted to be heated from a source of radiant and convex heat, diagrammatically represented as a radiator 12. The tube 10 extends at an angle so that its upper end lies substantially above the radiator 12. The end of the tube 10 is threaded to receive a nut 14 and a valve body 16. A U-shaped strip 18 of thermostatic bimetal is apertured to fit over the threaded end of the tube 10 and is clamped in position between the nut 14 and valve body 16.

As best shown in Figs. 1 and 2, the valve body 16 is provided with a frusto-conical seat 20 against which a hemispherical valve 22 is adapted to engage. The valve 22 is preferably formed integrally with a stem 24 which projects through a hole 26 formed in the free end of a thermostatic strip 18. A pair of oppositely facing cup-shaped spring saddles 28, 30 are slidably mounted upon the stem 24, being normally held in separated position by a compression coil spring 32. Upward sliding movement of the saddle cup 28 is prevented by ears 34 struck on the stem 24. A separator 36, illustrated as a tube, holds the spring saddle cups 28, 30 separated. Under normal operating conditions hemispherical valve 22 would be held in position closing the port 38 in the end of the valve seat member 16, as shown in Fig. 1, wherein the bimetal thermostatic strip 18 resiliently engages the lower saddle 30, and through the latter, the spacing sleeve 36 and saddle 28 resiliently hold the valve 22 against its seat 20.

When, however, the radiator 12, and hence the thermostatic strip 18, become excessively hot, the thermostatic strip 18 will contract to the position in which it is shown in Fig. 2. In this position, the valve 22 can be held against its seat only by the spring 32, so that if the pressure in the tube or pipe is less than atmospheric pressure, atmospheric pressure acting upon the outer face of the valve 22 will move the latter from the position in which it is shown in dotted lines in Fig. 2 to the position in which it is shown in full lines in said figure.

As the thermostatic strip 18 becomes cooler, the free end thereof will move outwardly and gradually increase the force by which the valve 22 is held against its seat 20, due to increasing compression of the spring 32. When the spring 32 has been compressed to such an extent that the separator 36 forms a positive stop preventing further movement of the spring saddle 30 relative to the spring saddle 28, the full force of the thermostatic strip 18 is applied to the valve 22 to hold the latter on its seat. The thermostatic strip 18 may be so proportioned relative to the effective area of the valve 22 that at certain relatively low temperatures the valve 22 will be held against its seat with such great force that no degree of vacuum in the tube 10 will be sufficient to open the valve. The spring 32 is sufficiently long in its uncompressed state that the free end of the thermostatic element may move up against the end face of the valve body 16 without entirely relieving the spring.

The valve of my invention is particularly useful where the body into which air or other fluid is to be admitted, under certain temperature conditions, contains obnoxious or dangerous gases or fumes and in which the pressure is not uniformly below atmospheric pressure or below the pressure of some other fluid which is to be admitted to the body.

While I have shown and described a preferred embodiment of my invention, it will be understood by those skilled in the art that the principles of the invention may be embodied in many other forms, all coming within the scope of the claims which follow.

I claim:

1. A temperature responsive control valve for internal combustion heaters comprising a tubular support, an inwardly facing valve seat secured to said support, a bimetal thermostatic element having one end secured to said support, a valve engageable with said seat, a resilient lost motion connection between said valve and the free end of said element to yieldingly hold said valve outwardly against said seat when said element is heated above a predetermined temperature, and positively operating means to hold said valve against said seat when said element is cooled below said predetermined temperature.

2. A thermostatically controlled valve comprising a valve seat, a valve engageable with said seat, heat responsive means effective at low temperatures positively to hold said valve closed and ineffective to hold said valve closed at high temperatures, and resilient means effective when said heat responsive means is ineffective to hold said valve against said seat.

3. A temperature responsive valve comprising a valve seat, a valve engageable with said seat, a spring exerting a force to hold said valve against said seat, a heat responsive element operable to decrease the force of said spring as the temperature thereof rises, and a rigid part interposed between said heat responsive element and said valve to cause said element positively to hold said valve against its seat when said element is at a predetermined relatively low temperature.

4. A thermostatically controlled valve comprising a tube, a nut and a valve body threaded upon said tube, a thermostatic element having one end surrounding said tube and clamped between said nut and said body, an inwardly facing valve seat in said body, a valve cooperable with said seat, a resilient member tending to hold said valve outwardly against said seat, and means actuated by said thermostatic element for increasing the degree of deformation of said resilient element with decreases in the temperature of the thermostatic element.

5. A thermostatically controlled valve comprising a tube, a nut and a valve body threaded upon said tube, a thermostatic element having one end clamped between said nut and body, a valve seat in said body, a valve engageable with said seat, a spring for holding said valve against said seat, means controlled by said thermostatic element for increasing the degree of deformation of said spring with decreases in the temperature of said thermostatic element, and a rigid member for transmitting force from said thermostatic element to said valve after said spring has been deformed to a predetermined extent.

HENRY J. DE N. McCOLLUM.